Feb. 29, 1944.                L. D. HAGENBOOK                2,343,144
                 SELF-LOADING DEVICE FOR SHAKER CONVEYERS
                       Filed Oct. 7, 1942            7 Sheets-Sheet 1
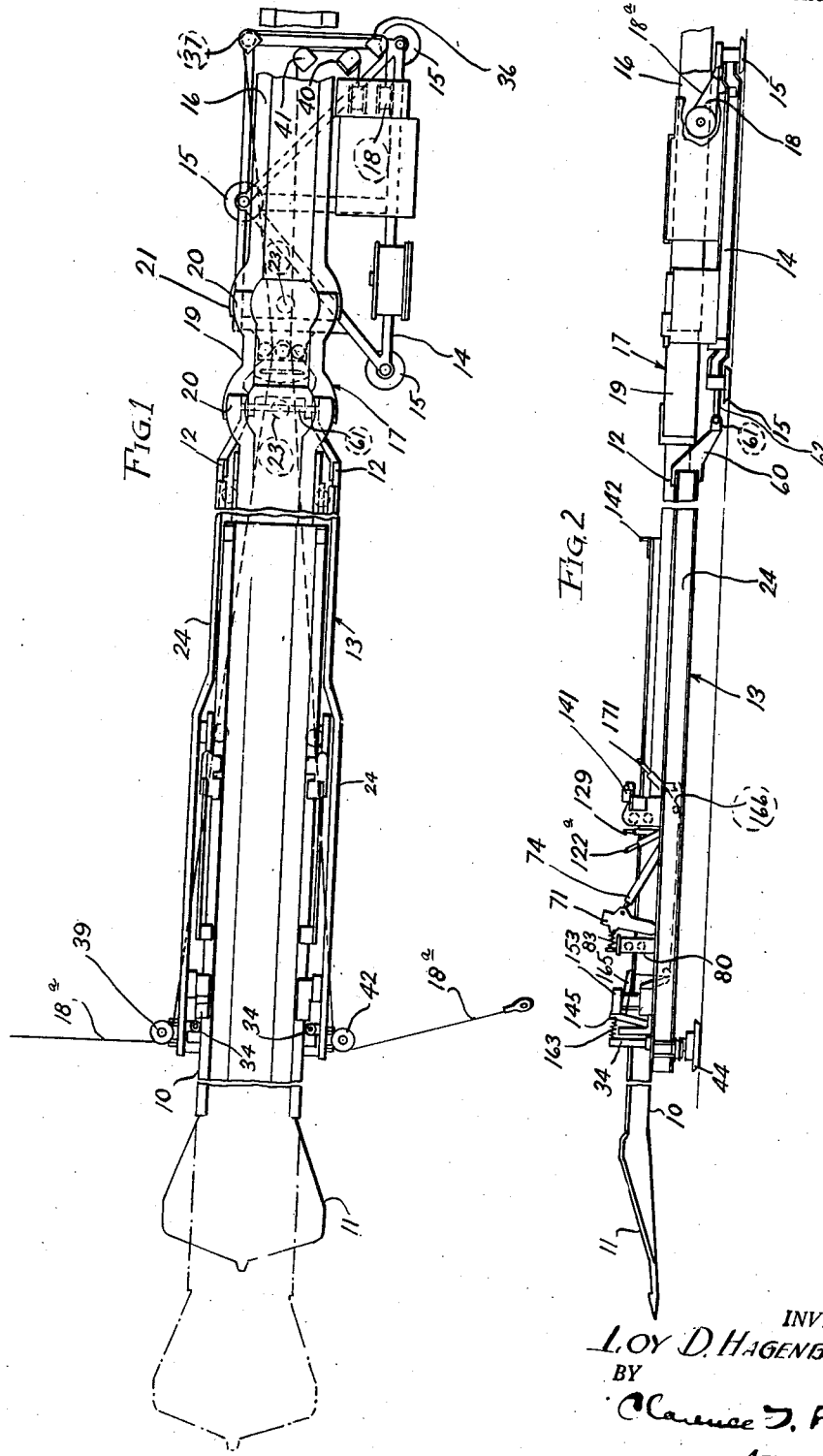
INVENTOR.
LOY D. HAGENBOOK
BY
Clarence J. Poole
ATTORNEY

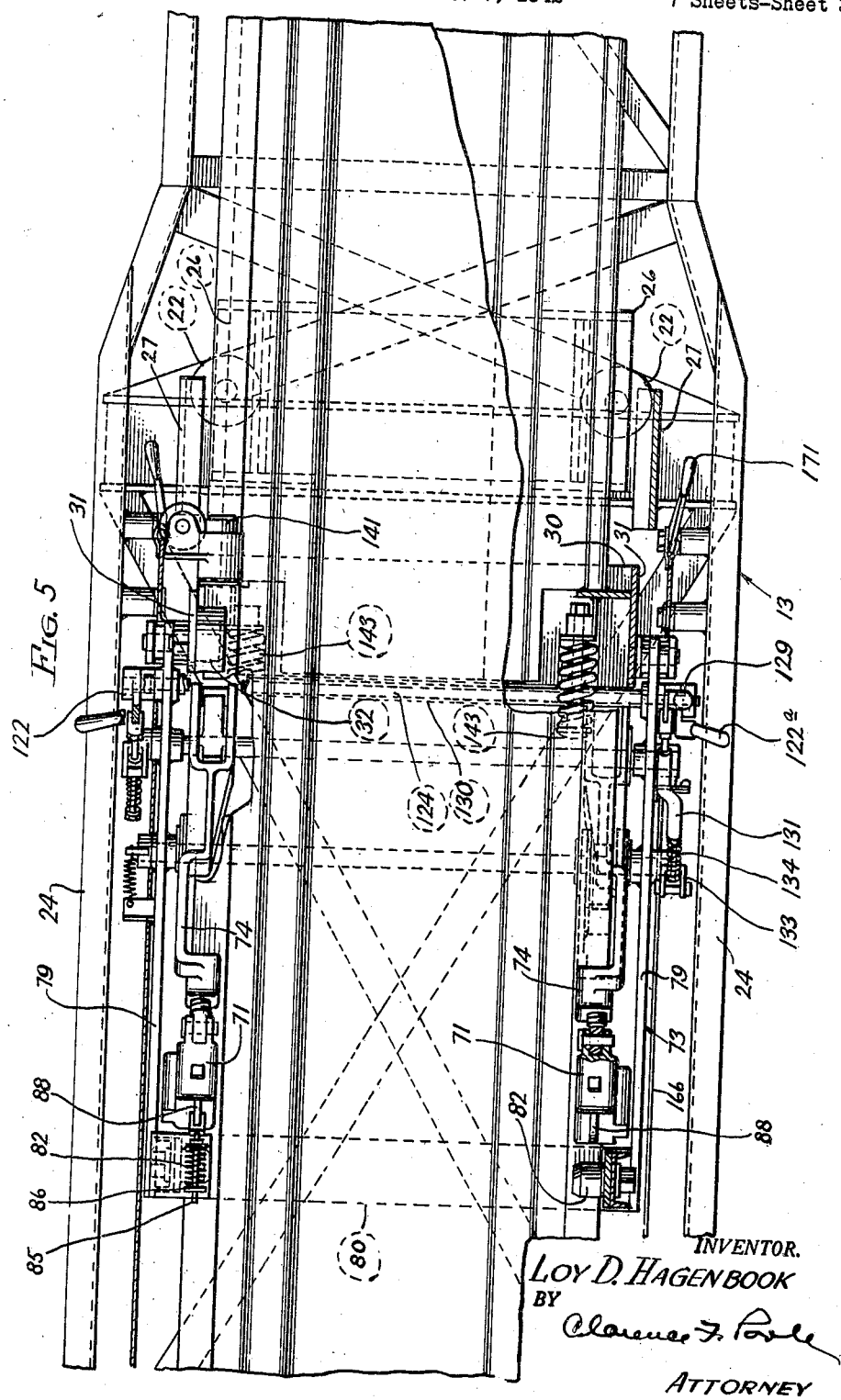

Feb. 29, 1944.    L. D. HAGENBOOK    2,343,144
SELF-LOADING DEVICE FOR SHAKER CONVEYERS
Filed Oct. 7, 1942    7 Sheets-Sheet 4
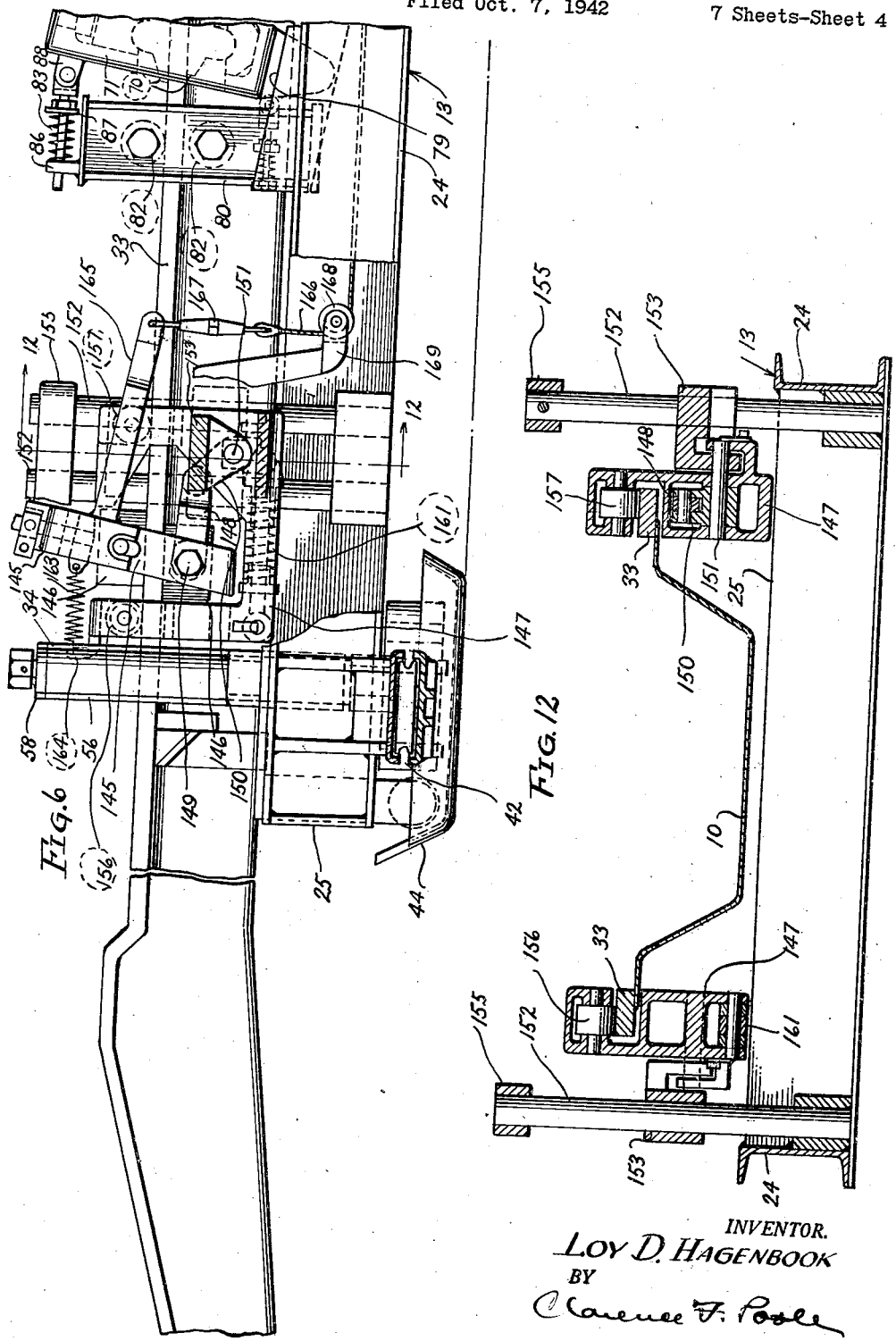
INVENTOR.
*Loy D. Hagenbook*
BY
*Clarence F. Poole*
ATTORNEY

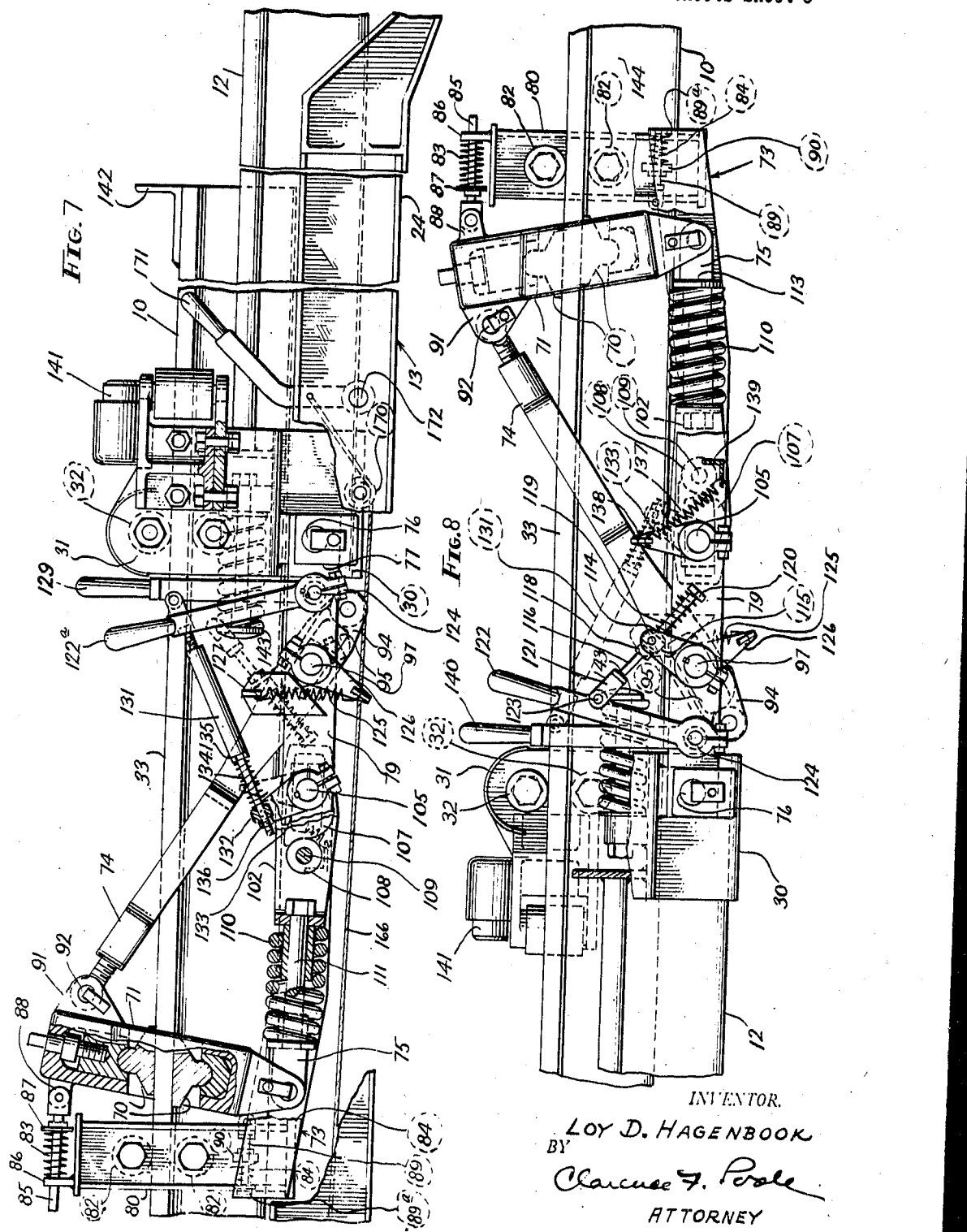
Feb. 29, 1944.  L. D. HAGENBOOK  2,343,144
SELF-LOADING DEVICE FOR SHAKER CONVEYERS
Filed Oct. 7, 1942  7 Sheets-Sheet 5
INVENTOR.
LOY D. HAGENBOOK
BY
Clarence F. Poole
ATTORNEY

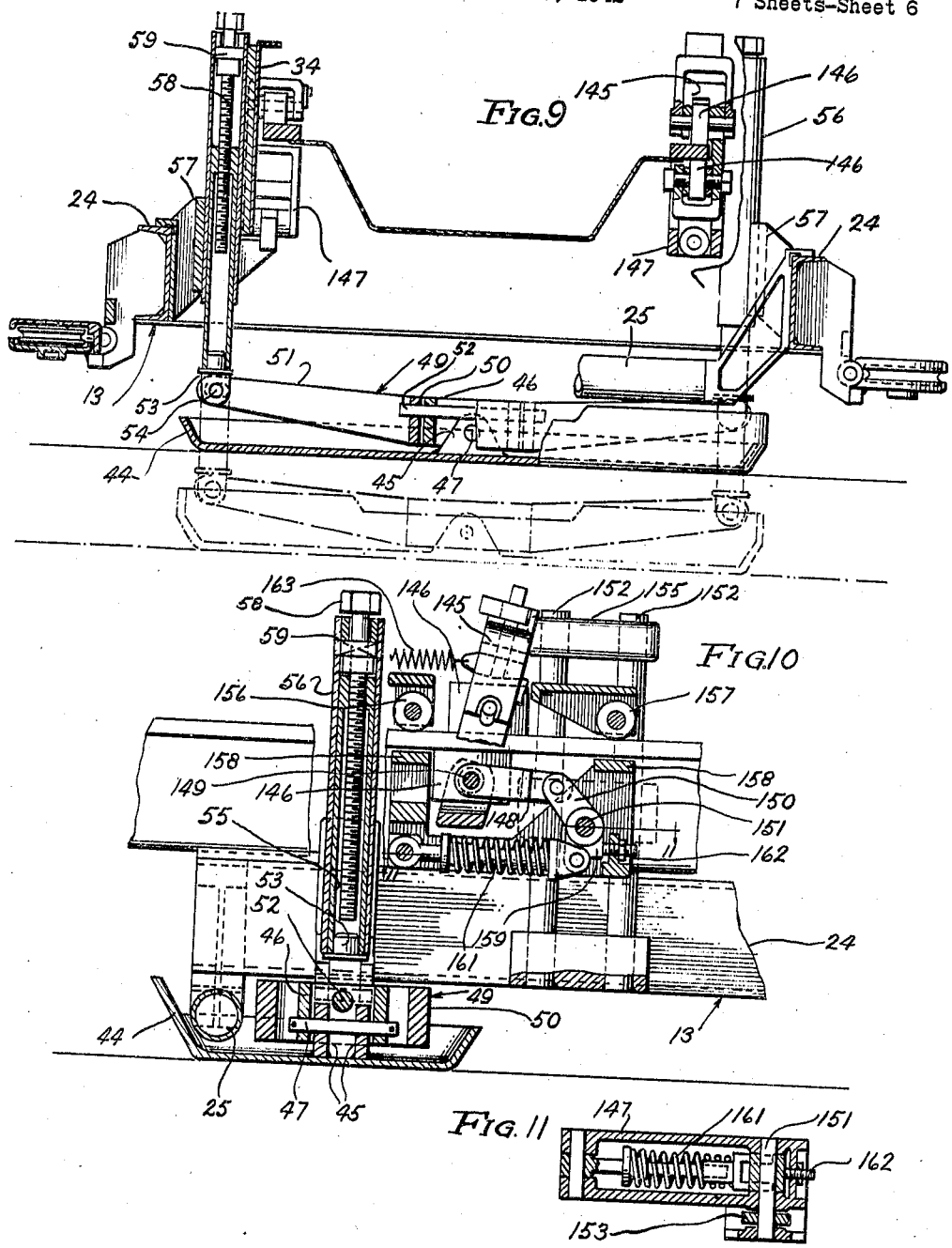

Feb. 29, 1944.  L. D. HAGENBOOK  2,343,144
SELF-LOADING DEVICE FOR SHAKER CONVEYERS
Filed Oct. 7, 1942  7 Sheets-Sheet 7
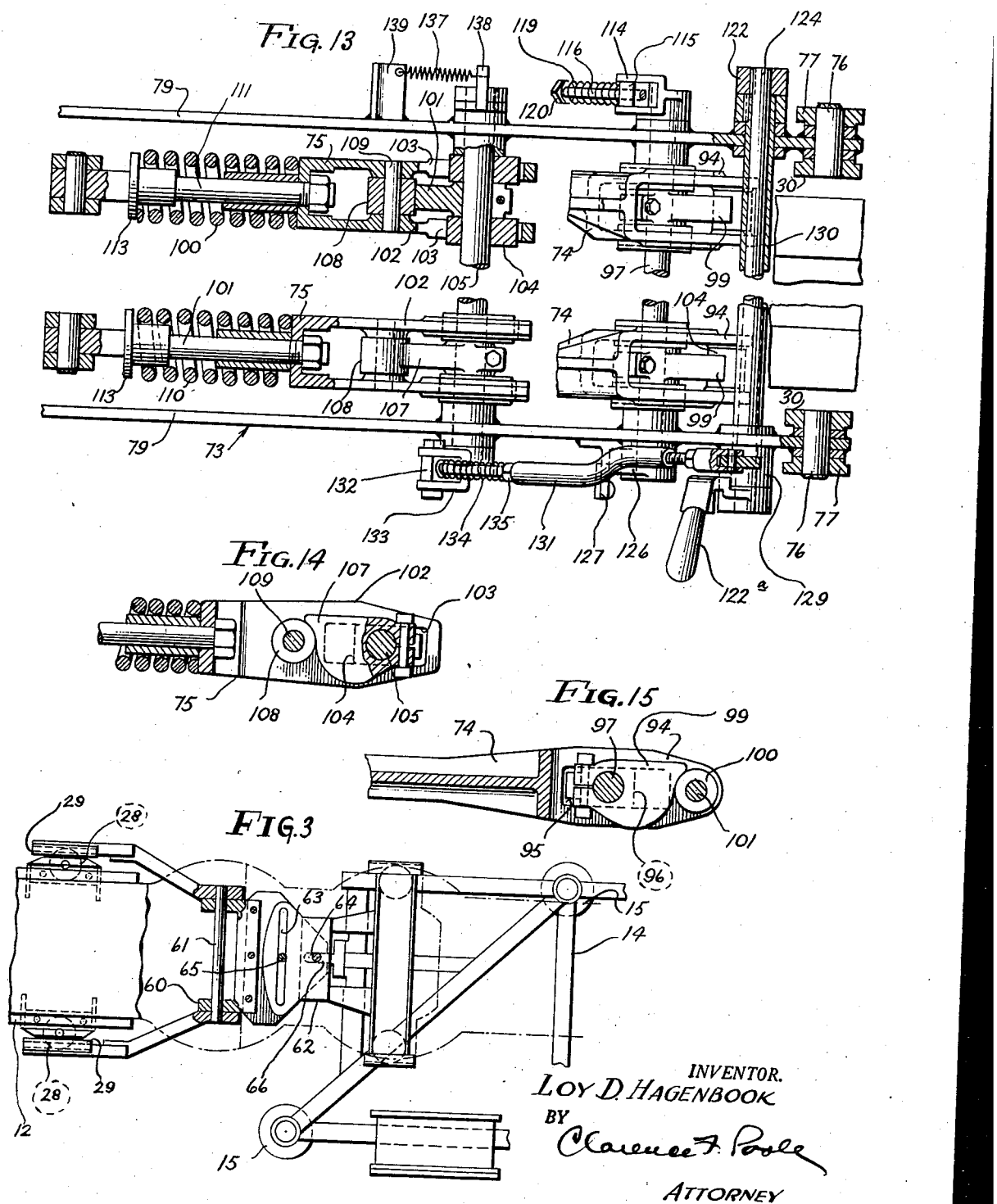
INVENTOR.
LOY D. HAGENBOOK
BY
Clarence F. Poole
ATTORNEY Patented Feb. 29, 1944

2,343,144

UNITED STATES PATENT OFFICE 2,343,144

SELF-LOADING DEVICE FOR SHAKER CONVEYERS

Loy D. Hagenbook, Chicago, Ill., assignor to Goodman Manufacturing Company, Chicago, Ill., a corporation of Illinois Application October 7, 1942, Serial No. 461,119

15 Claims. (Cl. 198—220)

This invention relates to improvements in self-loading devices for shaker conveyers of the type utilized for picking up loose material such as coal, rock, or the like from the ground.

The principal objects of my invention are to provide a novel and simplified form of self-loading device for shaker conveyers of the type which may be moved laterally across the coal face by power and including a simplified and improved feeding means for the extensible or pick-up trough section of the conveyer, together with an improved form of guide frame for guiding and swinging this trough section from side to side during the loading operation.

A more specific object of my invention is to provide a new and improved form of adjustable and flexible mounting for the forward end of the guide frame, for supporting said frame for slidable movement along the ground.

Still another object of my invention is to provide a simplified form of feeding device, together with a novel means for holding the extensible trough section of the conveyer from backward slipping movement, when the loading device is working upwardly along a grade.

The device of my present invention is somewhat similar to that disclosed in my prior Patent No. 2,280,043, which was filed December 24, 1940, but differs therefrom in that the feeding and holding mechanism for the extensible trough section is of a simplified form and in that a novel form of adjustable and flexible mounting is provided for the forward end of the laterally swinging frame, which supports and guides the reciprocating and extensible trough sections of the conveyer.

Other objects of my invention will appear from time to time as the following specification proceeds and with reference to the accompanying drawings wherein:

Figure 1 is a plan view of a loading device constructed in accordance with my invention;

Figure 2 is a view in side elevation of the device shown in Figure 1;

Figure 3 is an enlarged detail fragmentary plan view, with certain parts shown in horizontal section in order to illustrate certain details of connection of the swinging frame to the stationary base frame;

Figure 5 is a fragmentary plan view of the central portion of the loading device, drawn to substantially the same scale as Figure 4 and constituting in effect a continuation of Figure 4;

Figure 6 is an enlarged view in side elevation of the forward end of the loading device, with certain parts shown in longitudinal section;

Figure 7 is a fragmentary side elevational view of the central portion of the device shown in Figure 1, drawn to the same scale as Figure 6 and with certain parts broken away and certain other parts in longitudinal section;

Figure 8 is a fragmentary view in side elevation somewhat similar to Figure 7, but showing the opposite side of the feeding mechanism from that shown in Figure 7;

Figure 9 is an enlarged transverse sectional view, showing certain details of the support for the laterally swinging frame on the ground;

Figure 10 is an enlarged detail fragmentary longitudinal sectional view showing certain details of the flexible and adjustable support for the forward end of the laterally swinging frame on the ground, and showing certain details of the means for holding the extensible trough section of the conveyer from backward slipping movement with respect to the reciprocating trough section;

Figure 11 is an enlarged detail sectional view taken on line 11—11 of Figure 10;

Figure 12 is an enlarged sectional view taken substantially along line 12—12 of Figure 6;

Figure 13 is an enlarged fragmentary detail plan view of the feeding mechanism, with the extensible and reciprocating troughs of the conveyer broken away, and with certain other parts broken away and shown in horizontal section;

Figure 4:
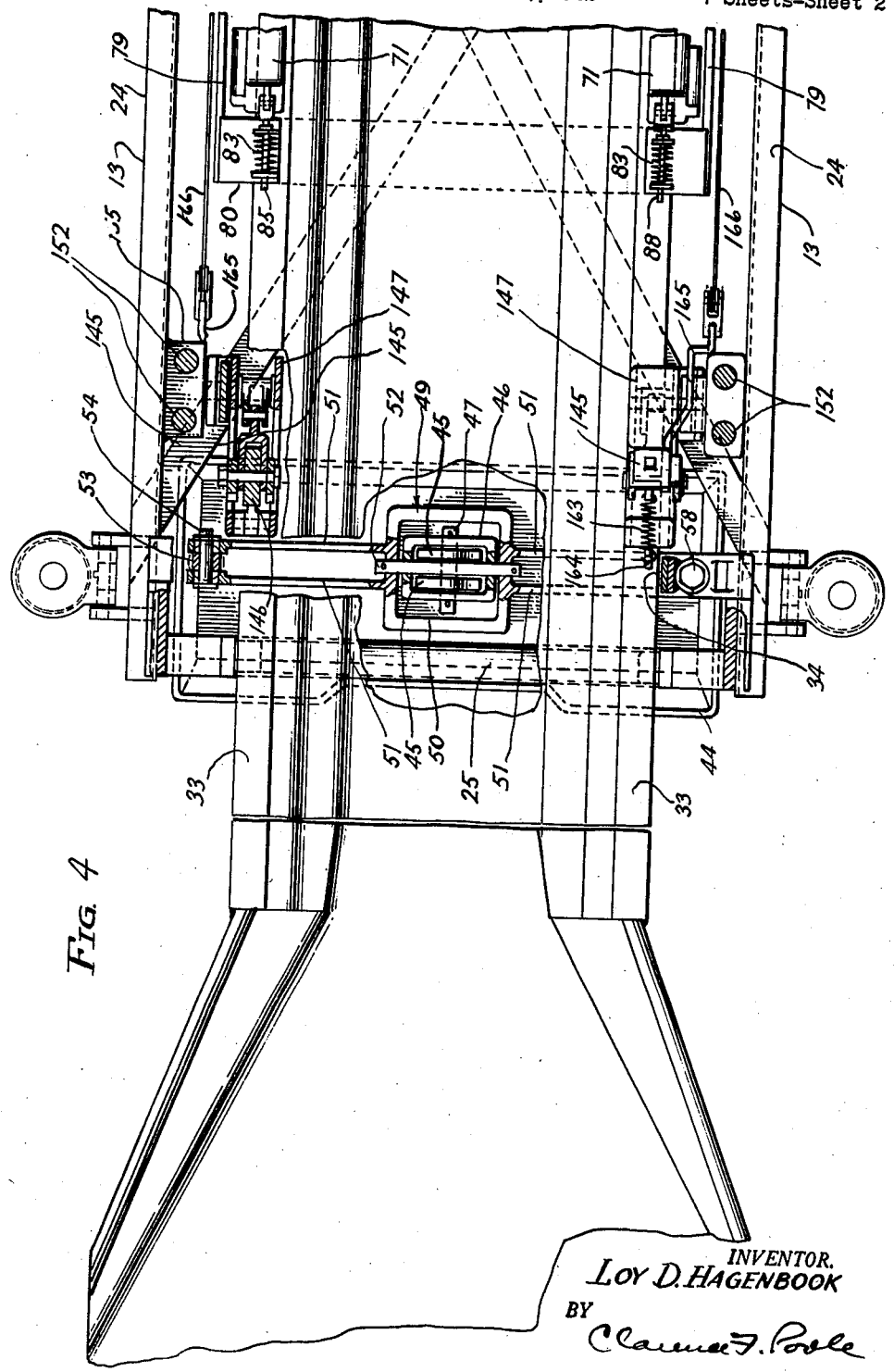
Figure 4 is an enlarged fragmentary plan view of the forward end of the loading device, with certain parts broken away and certain other parts shown in horizontal section.

Figure 14 is an enlarged fragmentary detail view in side elevation of a portion of one of the feeding links of the feeding mechanism, with certain parts shown in longitudinal section; and Figure 15 is an enlarged fragmentary detail view in side elevation of a portion of another of the feeding links of the feeding mechanism from that shown in Figure 14, with certain parts shown in longitudinal section.

In the drawings, the embodiment of my invention illustrated includes generally a pick-up member or extensible trough section 10 having a shovel 11 on the forward end thereof, for picking up loose material from the ground. Said extensible trough section is mounted for extensible or retractible movement with respect to the reciprocating trough section 12, and said reciprocating and extensible trough sections are supported and guided in an elongated laterally swingable frame 13, connected at its rear end to a base 14, for transverse swinging movement with respect to said base.

The base 14 as herein shown is provided with three spaced ground engaging shoes 15, which form a support therefor and which have threaded engagement therewith (not shown) so as to adjust the plane of said base with respect to the ground (see Figures 1 and 2). The details of this base and the threaded mounting of the ground engaging shoes are not herein shown or described since they are no part of my present invention. Said base is adapted to be held in position on the ground during operation of the conveyor by means of a plurality of jacks (not shown) interposed between said base and the mine roof, and forms a support for a reciprocating trough section 16 of a shaker conveyer trough line, and for a swivel generally indicated by reference character 17. Said base also forms a mounting for a pair of winding drums 18, 18 and the drive mechanism therefor, which are adapted to swing the frame 13 and extensible and reciprocating trough sections 10 and 12 laterally with respect to said base by means of flexible cables 18a, 18a wound thereon.

The swivel 17 may be of any well known form and, as herein shown, includes a relatively short intermediate trough section 19 having outwardly flared curved forward and rear ends 20, 20, one of which ends is nested within a corresponding curved flared end 21 of the trough section 16, and the other of which has a curved flared rear end of the trough section 12 nested therein. Said intermediate trough section is pivotally connected to said trough sections by means of pivotal bearing members 23, 23, to form a continuous trough from the reciprocating trough section 12 to the trough section 16, when said reciprocating trough section is at various angular positions with respect to said base.

The elongated frame 13, as herein shown, extends forwardly from the swivel 17 along opposite sides of the reciprocating trough section 12 and the extensible trough section 10, and includes a pair of channeled side frame members 24, 24, connected together at their forward ends by means of a transverse tube or pipe 25, and suitably braced intermediate their ends, to provide a relatively rigid support and guide for said reciprocating and extensible trough section.

The connection from the rear end of the frame 13 to the base 14 is shown in Figure 3 and is somewhat similar to that disclosed in my prior Patent No. 2,280,043, so will only herein be described in so far as is necessary to make my present invention readily understandable. Said connection includes a connecting member 60 herein shown as being transversely pivoted to the rear end of said frame on a transverse shaft 61. Said connecting member extends along the upper and lower sides of a guide member 62 secured to the base 14 and is pivotally and slidably guided in a transversely extending slot 63 and in a longitudinally extending slot 64, formed in said guide member, on pins 65 and 66 mounted in said connecting member. This forms a guide for said frame for horizontal swinging movement about axes coincident with spaced pivotal axes of the bearing members 23, 23 (see Figure 3).

The reciprocating trough section 12 is mounted on the frame 13 for reciprocable movement with respect thereto on a pair of frusto-conical rollers 22, 22 mounted in brackets 26, 26 projecting laterally from opposite sides of said reciprocating trough section. Said rollers engage V-shaped guides 27, 27 extending longitudinally of said frame, and mounted thereon. In a similar manner, a pair of frusto-conical rollers 28, 28 are mounted at the rear end of said reciprocating trough section and engage V-shaped guide tracks 29, 29, on said frame. (See Figure 3.)

A bracket 30 extends across the bottom of the forward end of the reciprocating trough section and upwardly along opposite sides thereof, and is provided with two upright sides 31, 31 extending upwardly along opposite sides of the reciprocating and extensible trough sections. Each of said sides has a pair of vertically spaced rollers 32, 32 mounted thereon, which are adapted to have engagement with the upper and lower sides of bearing plates 33, 33, projecting laterally from opposite sides of said extensible trough section. Said rollers thus form a slidable support for said extensible trough section on the forward end of said reciprocating trough section.

The winding drums 18, 18, for swinging the frame 13 by power, are independently operable and are no part of my present invention so will not herein be shown or described in detail. One of the cables 18a is trained rearwardly from its winding drum about a sheave 36, and transversely to the side of said frame opposite from said drum about a sheave 37, and from thence is guided forwardly beneath the conveyer and around a sheave 39 at the forward end of said frame. From thence, said cable is trained laterally, and its free end is adapted to be connected to a fixed abutment, to swing said frame to the right in an obvious manner. The other cable 18a is trained rearwardly and around a sheave 40 and thence inwardly around a sheave 41, and is guided forwardly from said sheave beneath the conveyer to a sheave 42 on the left-hand forward end of said frame, for swinging said frame to the left.

The adjustable and flexible support for the forward end of the frame 13 includes a ground engaging shoe 44. Said shoe is disposed at the forward end of said frame and extends transversely beneath said frame. A pair of spaced upright supporting ears 45, 45 extend upwardly from the central portion of said frame and have a yoke member 46 pivoted thereto by means of a longitudinally extending pivotal pin 47. Said yoke member forms a pivotal mounting for a transverse bar 49. Said transverse bar is herein shown as having an enlarged central portion 50 in the form of an open rectangle, with parallel spaced arms 51, 51 extending laterally in opposite directions, from opposite sides thereof (see Figure 4). Said central portion 50 extends around said yoke member and is pivotally connected thereto by a transverse pivotal pin 52, which extends laterally through opposite sides of said open rectangle. A connecting member 53 is mounted between each pair of said arms, adjacent the outer ends thereof, and is pivotally connected thereto by means of a longitudinally extending pivotal pin 54. Said connecting member, as herein shown, has a lower end of a tube or pipe 55 mounted thereon, which is slidably guided within a corresponding tube or pipe 56, mounted on an inwardly extending support portion 57 of the frame 13. (See Figure 9.)

The pipe 55 is closed at its upper end and is herein shown as having a rod 58 threaded therein. Said rod is journaled in a bearing 59, mounted in the upper end of the pipe 56, and has a hex head on its upper end so that turning movement of said head will vertically adjust the pipe 56 along the pipe 55 and provide a vertical adjustment for the forward end of the frame 13 on the shoe 44. Thus a flexible mounting has been provided for the forward end of the frame 13 on the shoe 44, which will permit said frame and the extensible and reciprocating troughs to be vertically adjusted with respect to the ground, and which will permit said shoe to move along an uneven bottom without twisting said frame and causing binding between said frame and said reciprocating and extensible trough sections.

Upright bearing shoes 34, 34 are mounted on inner sides of the pipes 56, 56 and are adapted to engage the outsides of the bearing plates 33, 33 to laterally swing the extensible trough section 10 upon lateral swinging movement of the frame 13.

The feeding means for extending or retracting the extensible trough section with respect to the reciprocating trough section includes two pairs of friction grip blocks 70, 70 adapted to have gripping engagement with the upper and lower sides of the bearing plates 33, 33. Said grip blocks are pivotally mounted in carrier members 71, 71 extending inwardly along said bearing plates and upwardly and downwardly therefrom. Said carrier members are connected with a floating frame 73 by means of an upper link 74 and a lower link 75. The floating frame 73 is pivotally connected to opposite sides of the forward end of the bracket 30 by means of pivotal pins 76, 76 extending through brackets 77, 77 projecting outwardly from opposite sides of the bracket 30 and through side arms 79, 79 of said floating frame.

The side arms 79, 79 of the floating frame 73 extend forwardly from said pivotal pins along opposite sides of the extensible trough section 10 and are connected to a U-shaped forward portion 80 of said frame, which extends beneath and upwardly along opposite sides of the extensible trough section and forms a slidable support for said U-shaped portion on said extensible trough section. Each of the upright side members of the U-shaped portion 80 has a pair of vertically spaced rollers 82, 82 mounted on the inner sides thereof and projecting inwardly therefrom. One of said rollers is disposed above and the other of said rollers is disposed below the bearing plate 33, to form a slidable support for the forward end of said floating frame on said extensible trough section.

The carrier members 71, 71 are held in a position so the links 74, 74 or 75, 75 will engage the grip blocks 70, 70 with the bearing plates 33, 33 at the beginning of the forward or return strokes of the conveyer, depending upon whether it is desired to extend or retract the extensible trough section, by means of a pair of springs 83, 83 urging the upper ends of said carrier members in a direction towards the rear of the conveyer and a pair of springs 84, 84, urging the forward ends of said carrier members in a direction towards the forward end of the conveyer (see Figures 7 and 8).

Each spring 83 encircles a plunger 85 slidably mounted in a bracket 86, projecting upwardly from the forward end of one upright side of the floating frame 73. Said spring abuts said bracket and a collar 87 on said plunger, and said plunger is pivotally connected to an ear 88, projecting forwardly from said carrier member, adjacent the upper end thereof.

The springs 84, 84 are mounted in a manner similar to the springs 83, 83 and each encircles a plunger 89 pivotally connected with the carrier member 71, adjacent its lower end. Said springs are each interposed between a nut 89a on the end of said plunger and a bracket 90, forming a slidable support for said plunger, and urge their associated carrier member into a rearwardly inclined position. It should here be noted that the strength of the springs 83, 83 and 84, 84 is not sufficient to engage the grip blocks 70, 70 with the bearing plates 33, 33 with sufficient force to move the extensible trough section with the reciprocating trough section, but is only sufficient to position said carrier members so the gripping action of the blocks will be effected at the beginning of the forward or return strokes of the conveyer, without any slippage or lost motion.

Each carrier member 71 is provided with an ear 91, projecting rearwardly from the upper end thereof, to which is connected the link 74 by means of a pivotal pin 92 (see Figures 7 and 8). Said link extends angularly rearwardly and downwardly from said ear, and as herein shown is provided with a bifurcated rear end portion 94, the furcations of which are provided with longitudinally extending slots 95, 95. Said slots slidably engage blocks 96, 96 mounted on a transverse shaft 97, on opposite sides of a holding cam 99 (see Figures 13 and 15). Said shaft is journaled in opposite side arms 79, 79 of the floating frame 73.

The holding cam 99 is adapted to engage a roller 100, mounted on the link 74, forwardly of the shaft 97, between the furcations of the bifurcated rear end portion 94 thereof, on a pivotal pin 101. Thus when the holding cams 99, 99 are in engagement with the rollers 100, 100, the links 74, 74 will be held from slidable movement with respect to the shaft 97, and will transmit a pulling force from the forward end of the reciprocating trough section 12 to the upper end of the carrier members 71, to engage the grip blocks 70, 70 with the bearing plate 33 upon the return strokes of the conveyer. Upon the forward strokes of the conveyer, said links will exert a pushing force on the upper ends of said carrier members, to pivot said carrier members in a direction to disengage said grip blocks from said bearing plates. This will retract the extensible trough section 10 within the reciprocating trough section 12.

The links 75, 75 are of a yieldable construction and are each provided with a bifurcated rear end portion 102, the furcations of which are provided with longitudinally extending slots 103, 103, slidably engaging blocks 104, 104 pivotally mounted on a transverse shaft 105, journaled at its ends in the side arms 79, 79 of the floating frame 73. A holding cam 107 is secured to said shaft, between the blocks 104, 104, and is adapted to engage a roller 108 mounted between the furcations of said bifurcated rear end portion, on a transverse pin 109. When said cam is engaged with said roller, said link will be held from longitudinal sliding movement with respect to said shaft and blocks, and will exert a pushing force on the lower end of the carrier member 71 upon the forward strokes of the conveyer and a pulling force on the lower end of said carrier member upon the return strokes of the conveyer, to extend said extensible trough section with respect to said reciprocating trough section when the holding cams 99, 99 are disengaged from the rollers 100, 100 and the links 74, 74 are free to slidably move with respect to the transverse shaft 97.

The yieldable links 75, 75 each include a compression spring 110 encircling a threaded member 111 and slidably mounted in and extending forwardly from the bifurcated rear end portion 102 of said links. Said spring is interposed between said bifurcated rear end portion and a shouldered portion 113 of said threaded member, and the strength of said springs is such that said yieldable links will normally act as solid members and will only yield, to release the grip blocks, upon the forward strokes of the conveyer, when the forward end of the shovel 11 engages a solid obstruction.

The operating means for the holding cam 99 includes a bifurcated lever arm 114, secured to the right-hand end of the shaft 97 and herein shown as projecting upwardly therefrom (see Figure 8). A connecting member 115 is pivotally connected between the furcations of said lever arm, adjacent the outer end thereof, for movement about an axis parallel to the pivotal axis thereof, and has a rod 116 slidably mounted therein. A stop or collar 118 is secured to said rod and is adapted to engage the connecting member 115, so movement of said rod in a direction towards the shovel 11 will pivot the lever arm 114 in a direction which is shown in Figure 8 to be a clockwise direction. A compression spring 119 encircles said rod and abuts said connecting member at one of its ends and abuts a head 120 of said rod, at its opposite end. The end of said rod opposite said head is shown as being threaded in a bifurcated connecting member 121, which is pivotally connected to a hand operated lever 122 by means of a pivotal pin 123. Said lever is keyed to a shaft 124, extending transversely beneath the extensible trough 10, and journaled at its ends in the side frame members 79, 79. A hand lever 122a is keyed to the opposite end of said shaft, to permit operation of the cams 99, 99 from either side of the machine. Thus, when either of the levers 122 or 122a are engaged with the hand and are moved towards the forward end of the loading device, the shaft 97 will be turned in the same direction, to disengage the holding cam 99 from the roller 100. Engagement of said holding cam with said roller is effected through the compression spring 119, when either of said hand levers are engaged by the hand and moved towards the rear end of the loading device. Said spring is provided to absorb any shocks which might otherwise be transmitted to said hand lever.

A tension spring 125 is provided to urge the cams 99, 99 into an engaged position. Said spring is connected between a connecting bracket 127 projecting upwardly from the left-hand side arm 79 and a lever arm 126, secured to the opposite end of the shaft 97 from the lever arm 114, and shown in Figure 7 as depending from said shaft.

The holding cams 107, 107 are operated by a hand lever 129 secured to a transverse sleeve 130 which is pivotally mounted on the shaft 124 and is journaled in the side arms 79, 79. Said hand lever is operatively connected with the transverse shaft 105 by a link 131, having operative connection with a bifurcated lever arm 133, keyed to the shaft 105. Said link has slidable engagement with a connecting member 132, which is pivotally mounted between the furcations of said lever arm 133, adjacent the upper end thereof. A compression spring 134 encircles the rear portion of said link and is interposed between the connecting member 132 and a nut 135 on said link, to urge said hand lever in an upright position. A nut 136 is threaded on the end of said link and is adapted to engage the connecting member 132, to move the lever arm 133 towards the rear of the loading device, to disengage the cams 107, 107 from the rollers 108, 108. Said compression spring is so arranged that when moving said hand lever towards the forward end of the loading device, to engage the cam 107 with the roller 108, the lever arm 133 will be moved through said spring, so said spring will absorb any shocks that might be transmitted from the reciprocating trough section to said hand lever.

The shaft 105 is urged in a direction to engage the holding cam 107 with the roller 108 by means of a tension spring 137 connected between the ends of an upright rocking arm 138, secured to the shaft 105, and a bracket 139 secured to the side frame member 79, which is the right-hand side frame member when looking towards the forward end of the machine. A hand lever 140 is provided on the end of the sleeve 130 opposite from the hand lever 129, so that operation of the feeding mechanism may be controlled from either side of the conveyer.

Extensible movement of the extensible trough section is limited by means of a pair of yieldable stops 141, 141, mounted on opposite sides of the bracket 30 and projecting upwardly therefrom and adapted to engage angles 142, 142 secured to and projecting upwardly from the bearing plates 33, 33, adjacent the rear ends thereof. Retractible movement of the extensible trough section is limited by means of a pair of yieldable stops 143, 143 mounted on opposite sides of the bracket 30 beneath and inwardly of the stops 141, 141, and engageable with stops 144, 144 on opposite sides of the forward portion of the extensible trough section.

Referring now in particular to the novel form of means for holding the extensible trough section from backward slipping movement with respect to the reciprocating trough section when the device is operating along an upwardly pitching seam, said holding means includes a pair of carrier members 145, 145, having friction grip blocks 146, 146 mounted therein and adapted to engage the upper and lower sides of the bearing plates 33, 33. The holding means are independently operable and the construction and operation of each holding means is the same, so one only will herein be described in detail. The carrier member 145 is mounted in an open central portion of a floating frame 147, and is connected thereto by means of a link 148, pivotally connected to said carrier member, for pivotal movement about an axis coaxial with the axis of pivotal connection of the lower grip block to said carrier member, by means of a bolt 149. The free end of said link is pivotally connected to a lever arm 150, pivotally connected to the rear portion of the frame 147 on a transverse pin 151 (see Figure 11). Said transverse pin also forms a pivotal connection for said floating frame 147 to a sliding bracket 153, which is mounted for free vertical movement on a pair of parallel spaced guide shafts 152, 152 (see Figures 6 and 12). The shafts 152, 152 are mounted at their lower ends in the frame 13 and project upwardly therefrom, and are connected together at their upper ends by means of a stop 155. Said floating frame may thus move vertically with respect to said guide shafts and may also pivot with respect thereto in a vertical plane about the axis of the pin 151.

The floating frame 147 is provided with supporting rollers 156 and 157 mounted on opposite sides of the open central portion thereof, which ride on the bearing plate 33 and form a support for said frame on said bearing plate. Said floating frame has guide portions 158, 158 extending beneath said bearing plate and inwardly therealong, to limit upward movement of said floating frame with respect to said bearing plate.

Means are provided to release the grip blocks 146, 146 from the bearing plate 33, when accidentally engaged therewith during the forward strokes of the conveyer, which includes a lever arm 159 depending from and formed integral with the lever arm 150 (see Figure 10). A yieldable link 161 is pivotally connected to said lever arm at its rear end and extends along and is pivotally connected at its opposite end to the forward end of said floating frame. The strength of the spring of said yieldable member is such that it normally serves as a solid member, but will yield when the grip blocks 146, 146 are engaged with the bearing plate 33, during the forward stroke of the conveyer, to permit said lever arm 159 to pivot in a forward direction, to release the grip blocks 146, 146 from the bearing plate 33 and prevent said grip blocks from accidentally holding the extensible trough section from extensible movement. An adjustable stop 162 is provided to limit movement of said lever arm in a rearward direction and to adjust the gripping action of said grip blocks.

A tension spring 163 is connected between the upper end of said carrier member 145 and a connecting bracket 164 projecting upwardly from the forward portion of the floating frame 147, to urge said carrier member in a direction to disengage the grip blocks 146, 146 from the bearing plates 33, 33.

The means for engaging the grip blocks 146, 146 with the bearing plates 33, 33 includes a lever arm 165 herein shown as being formed integrally with and projecting rearwardly from the carrier member 145 at a point disposed above the bearing plate 33. A cable 166 is connected to the free end of said lever arm through a turnbuckle 167. Said cable extends downwardly from said turnbuckle and is trained around a sheave 168 on a bracket 169 depending from and extending rearwardly from the floating frame 147. From thence said cable is trained around a sheave 170 mounted in the frame 13 adjacent the bracket 30, at the forward end of the reciprocating trough section 12 (see Figure 7). Said cable extends angularly upwardly from said sheave in a rearward direction and is secured at its free end to a hand lever 171 intermediate the ends of said hand lever. Said hand lever is pivotally mounted adjacent its lower end on the frame 13, by means of a pivotal pin 172.

In operation, when it is desired to hold the extensible trough section from backward slipping movement during extension thereof along an upwardly pitching seam, the hand lever 171 is moved in a rearward direction during the return strokes of the conveyer, to grip the grip blocks 146, 146 with the associated bearing plate 33. During the forward strokes of the conveyer, the hand is removed from said hand lever to permit the spring 163 to release said grip blocks. If, however, the hand should accidentally remain on said hand lever and maintain pressure thereon during the forward strokes of the conveyer, the link 161 will yield, to permit said grip blocks to be disengaged from said bearing plate, so said grip blocks will act to hold said extensible trough section from extensible movement. It should here be noted that the holding devices on each side of the conveyer are operated separately and that only one of said holding devices is necessary to hold the extensible trough section from backward slipping movement, a holding device being provided on each side of the conveyer, to permit the operator to hold the extensible trough from either side thereof.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a self-loading device for shaker conveyers, a reciprocating trough section, an extensible trough section mounted for extensible or retractible movement with respect to said reciprocating trough section, a frame extending along said reciprocating and extensible trough sections and forming a guide therefor and adapted to laterally swing said trough sections upon lateral swinging movement of said frame, and an equalizing support for supporting the forward end of said frame for movement along the ground, for relieving said frame from twisting stresses when transversely moved across an uneven bottom including a supporting shoe slidably movable along the ground, a transverse bar pivotally mounted on said shoe for pivotal movement with respect thereto about a longitudinal axis, and supporting connections between opposite ends of said bar and said frame.

2. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for the forward end of said frame on the ground for relieving said frame from twisting stresses when transversely moved across an uneven bottom including a supporting shoe slidably movable along the ground, a bar extending transversely of said shoe and mounted thereon for pivotal movement with respect thereto about axes extending both transversely and longitudinally of said frame, and an upright supporting member pivotally connected to each end of said bar and having supporting connection with said frame.

3. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for the forward end of said frame on the ground for relieving said frame from twisting stresses when transversely moved across an uneven bottom including a supporting shoe slidably movable along the ground, a bar extending transversely of said shoe and mounted thereon for pivotal movement with respect thereto about axes extending both transversely and longitudinally of said frame, and a pair of upright supporting members pivotally connected to said bar, adjacent opposite ends thereof, for movement about axes extending longitudinally of said bar, said supporting members having supporting connection with said frame adjacent opposite sides thereof.

4. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for the forward end of said frame on the ground for relieving said frame from twisting stresses when transversely moved across an uneven bottom including a supporting shoe slidably movable along the ground, a bar extending transversely of said shoe and mounted thereon for pivotal movement with respect thereto about axes extending both transversely and longitudinally of said frame, and a pair of upright supporting members pivotally connected to said bar, adjacent opposite ends thereof, for movement about axes extending longitudinally of said bar, said supporting members having vertically adjustable supporting connection with said frame adjacent opposite sides thereof for vertically adjusting said frame with respect to said shoe.

5. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for the forward end of said frame on the ground for relieving said frame from twisting stresses when transversely moved across an uneven bottom including a supporting shoe slidably movable along the ground, a bar extending transversely of said shoe and mounted thereon for pivotal movement with respect thereto about axes extending both transversely and longitudinally of said frame, and a pair of upright supporting members pivotally connected to said bar, adjacent opposite ends thereof, for movement about axes extending longitudinally of said bar, said supporting members having vertically adjustable supporting connection with said frame adjacent opposite sides thereof for vertically adjusting said frame with respect to said shoe, and each including a pair of telescopic members and means for extending one with respect to the other.

6. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for the forward end of said frame on the ground for relieving said frame from twisting stresses when transversely moved across an uneven bottom including a supporting shoe slidably movable along the ground, a bar extending transversely of said shoe and mounted thereon for pivotal movement with respect thereto about both transverse and longitudinally extending axes, and a pair of upright supporting members pivotally connected to said bar, adjacent opposite ends thereof, for movement about axes extending longitudinally of said bar, said supporting members having vertically adjustable supporting connection with said frame adjacent opposite sides thereof for vertically adjusting said frame with respect to said shoe, and each including a pair of telescopic members, and a threaded member threaded in one of said members and having engagement with said other member, for extensibly moving one of said members with respect to the other.

7. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for supporting the forward end of said frame for movement along the ground and for relieving said frame from twisting stresses when transversely moved across an uneven bottom including a ground engaging shoe, a yoke member pivotally mounted on said shoe for pivotal movement about an axis extending longitudinally of the conveyer, a transverse bar pivotally mounted on said yoke for pivotal movement about an axis extending transversely of the conveyer, and pivotal supporting connections between opposite ends of said bar and said frame.

8. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for supporting the forward end of said frame for movement along the ground and for relieving said frame from twisting stresses when transversely moved across an uneven bottom including a ground engaging shoe, a yoke member pivotally mounted on said shoe for pivotal movement about an axis extending longitudinally of the conveyer, a transverse bar pivotally mounted on said yoke for pivotal movement about an axis extending transversely of the conveyer, and a pair of upright supporting members pivotally connected to said bar adjacent opposite ends thereof and having supporting connection with said frame.

9. In a self-loading device for shaker conveyers, a frame transversely movable along the ground, a reciprocating trough section mounted for reciprocable movement with respect to said frame, an extensible trough section guided by said frame and mounted for extensible or retractible movement with respect to said reciprocating trough section, and an equalizing support for supporting the forward end of said frame for movement along the ground and for relieving said frame from twisting stresses when transversely moved across an uneven bottom including a ground engaging shoe, a yoke member pivotally mounted on said shoe for pivotal movement about an axis extending longitudinally of the conveyer, a transverse bar pivotally mounted on said yoke for pivotal movement about an axis extending transversely of the conveyer, and a pair of vertically adjustable upright supporting members pivotally connected to said bar adjacent opposite ends thereof and forming a vertically adjustable support for the forward end of said frame on said bar.

10. In a self-loading device for shaker conveyers, a reciprocating trough section, an extensible trough section, feeding means for extensibly or retractibly moving said extensible trough section with respect to said reciprocating trough section, a frame extending along said reciprocating and extensible trough sections, means auxiliary to said feeding means and manually operable to engage said extensible trough section and hold said trough section from backward slipping movement with respect to said reciprocating trough section, and a floating connection between said frame and said holding means including a vertically extending guide member on said frame and having said holding means mounted for vertical slidable movement therealong.

11. In a self-loading device for shaker conveyers, a reciprocating trough section, an extensible trough section, feeding means for extensibly or retractibly moving said extensible trough section with respect to said reciprocating trough section, a frame extending along said reciprocating and extensible trough sections and forming a guide therefor, and means auxiliary to said feeding means and manually operable to engage said extensible trough section and hold said trough section from backward slipping movement with respect to said reciprocating trough section, a slidable connection between said holding means and said extensible trough section, guide members extending upwardly from each side of said frame, and a vertically slidable mounting for said holding means on said guide members.

12. In a self-loading device for shaker conveyers, a reciprocating trough section, an extensible trough section, friction grip feeding means engageable with said extensible trough section during certain strokes of the conveyer for extensibly or retractibly moving said extensible trough section with respect to said reciprocating trough section, a frame extending along said reciprocating and extensible trough sections and forming a guide therefor, and manually operable friction grip holding means auxiliary to said feeding means, for holding said extensible trough section from backward slipping movement with respect to said reciprocating trough section, said holding means including a floating frame slidably supported on said extensible trough section, a pair of friction grip blocks adapted to engage said extensible trough section, a carrier member having said friction grip blocks mounted thereon, a pivotal connection between said carrier member and said floating frame, and a vertically slidable connection between said floating frame and said first mentioned frame.

13. In a self-loading device for shaker conveyers, a reciprocating trough section, an extensible trough section, friction grip feeding means engageable with said extensible trough section during certain strokes of the conveyer for extensibly or retractibly moving said extensible trough section with respect to said reciprocating trough section, a frame extending along said reciprocating and extensible trough sections and forming a guide therefor, and manually operable friction grip holding means auxiliary to said feeding means, for holding said extensible trough section from backward slipping movement with respect to said reciprocating trough section, said holding means including a floating frame slidably supported on said extensible trough section, a pair of friction grip blocks adapted to engage said extensible trough section, a carrier member having said friction grip blocks mounted thereon, a pivotal connection between said carrier member and said floating frame, and a connection between said floating frame and said first mentioned frame including a guide member extending upwardly from said first mentioned frame, and a vertically slidable connection between said floating frame and said guide member.

14. In a self-loading device for shaker conveyers, a reciprocating trough section, an extensible trough section, friction grip feeding means engageable with said extensible trough section during certain strokes of the conveyer for extensibly or retractibly moving said extensible trough section with respect to said reciprocating trough section, a frame extending along said reciprocating and extensible trough sections and forming a guide therefor, and manually operable friction grip holding means auxiliary to said feeding means, for holding said extensible trough section from backward slipping movement with respect to said reciprocating trough section, said holding means including a floating frame slidably supported on said extensible trough section, a pair of friction grip blocks adapted to engage said extensible trough section, a carrier member having said friction grip blocks mounted thereon, a pivotal connection between said carrier member and said floating frame, and a connection between said floating frame and said first mentioned frame including a guide member extending upwardly from said first mentioned frame, a member slidably guided on said guide member, and a transverse pivotal connection between said floating frame and said guide member.

15. In a self-loading device for shaker conveyers, a reciprocating trough section, an extensible trough section, feeding means for extensibly or retractibly moving said extensible trough section with respect to said reciprocating trough section, and means auxiliary to said feeding section, and manually operable to engage said extensible trough section to prevent backward slipping movement thereof including a carrier member, a pair of friction grip blocks mounted in said carrier member, means manually operable for engaging said grip blocks with said extensible trough section, a frame held from reciprocating movement, a connection between said frame and the lower end of said carrier member including a lever arm pivotally mounted on said frame, and means for causing said grip blocks to be automatically disengaged from said extensible trough section during the forward strokes of the conveyer including a yieldable link pivotally connected to said frame at one of its ends, an arm depending from said lever arm and having operative connection therewith, and a pivotal connection between the free end of said arm and said yieldable link, to permit yieldable movement of said lever arms and disengagement of said grip blocks from said extensible trough section during the forward strokes of the conveyer.

LOY D. HAGENBOOK.